US010159960B2

(12) United States Patent
Yang et al.

(10) Patent No.: US 10,159,960 B2
(45) Date of Patent: *Dec. 25, 2018

(54) CATALYSTS WITH ATOMICALLY DISPERSED PLATINUM GROUP METAL COMPLEXES

(71) Applicant: GM GLOBAL TECHNOLOGY OPERATIONS LLC, Detroit, MI (US)

(72) Inventors: Ming Yang, Troy, MI (US); Ryan J. Day, Waterford, MI (US); Se H. Oh, Troy, MI (US); Gongshin Qi, Troy, MI (US); Wei Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 115 days.

This patent is subject to a terminal disclaimer.

(21) Appl. No.: 15/334,109

(22) Filed: Oct. 25, 2016

(65) Prior Publication Data

US 2018/0111112 A1 Apr. 26, 2018

(51) Int. Cl.
*B01J 23/78* (2006.01)
*B01J 37/02* (2006.01)
(Continued)

(52) U.S. Cl.
CPC ............ *B01J 23/78* (2013.01); *B01D 53/945* (2013.01); *B01J 37/024* (2013.01);
(Continued)

(58) Field of Classification Search
CPC ........ B01J 21/00; B01J 23/78; B01J 37/0215; B01J 37/0236; B01J 37/024; B01J 37/08;
(Continued)

(56) References Cited

U.S. PATENT DOCUMENTS 4,201,714 A * 5/1980 Hughes .................... B01J 23/16
502/161
5,494,701 A 2/1996 Clough et al.
(Continued)

FOREIGN PATENT DOCUMENTS

CN 101185186 A 5/2008
CN 101522345 A 9/2009
(Continued)

OTHER PUBLICATIONS

Chen, et al; "Development of low temperature three-way catalysts for future fuel effecient vehicles"; Johnson Matthey Technol. Rev.; 2015; vol. 59; (1); pp. 64-67.
(Continued)

*Primary Examiner* — Jun Li
(74) *Attorney, Agent, or Firm* — Harness, Dickey & Pierce, P.L.C.

(57) ABSTRACT

A catalytic converter includes a catalyst. The catalyst includes a non-modified metal oxide support and platinum group metal (PGM) complexes atomically dispersed on the non-modified metal oxide support. The PGM complexes include a PGM species selected from the group consisting of an atom of a platinum group metal, a cluster including from 2 atoms to less than 10 atoms of the platinum group metal, and combinations thereof. An alkali metal or an alkaline earth metal is bonded to the PGM species. The alkali or alkaline earth metal is part of a structure including oxygen atoms and hydrogen atoms.

20 Claims, 7 Drawing Sheets

(51) Int. Cl.
*B01J 37/08* (2006.01)
*B01D 53/94* (2006.01)
*F01N 3/28* (2006.01)

(52) U.S. Cl.
CPC ....... *B01J 37/0215* (2013.01); *B01J 37/0236* (2013.01); *B01J 37/08* (2013.01); *F01N 3/2807* (2013.01); *B01D 2255/1021* (2013.01); *B01D 2255/2022* (2013.01); *B01D 2255/2092* (2013.01)

(58) Field of Classification Search
CPC .......... B01D 53/945; B01D 2255/1021; B01D 2255/2022; B01D 2255/2092
See application file for complete search history.

(56) References Cited

U.S. PATENT DOCUMENTS

| | | | |
|---|---|---|---|
| 5,603,983 | A | 2/1997 | Clough et al. |
| 5,633,081 | A | 5/1997 | Clough et al. |
| 5,756,207 | A | 5/1998 | Clough et al. |
| 6,022,825 | A | 2/2000 | Anderson et al. |
| 6,056,792 | A * | 5/2000 | Barr ................ C10L 1/143 44/362 |
| 7,323,432 | B2 | 1/2008 | Niihara et al. |
| 7,582,586 | B2 * | 9/2009 | Fanson ............. B01J 23/40 502/162 |
| 7,659,224 | B2 | 2/2010 | Shimazaki et al. |
| 7,820,585 | B2 * | 10/2010 | Hirata ............. B01D 53/945 117/903 |
| 7,964,167 | B2 | 6/2011 | Kim et al. |
| 8,057,767 | B1 | 11/2011 | Qi et al. |
| 8,211,392 | B2 | 7/2012 | Grubert et al. |
| 8,226,915 | B2 | 7/2012 | Qi et al. |
| 8,268,274 | B2 | 9/2012 | Kim et al. |
| 8,309,489 | B2 | 11/2012 | Roldan Cuenya et al. |
| 8,318,119 | B2 | 11/2012 | Qi et al. |
| 8,343,888 | B2 | 1/2013 | Kim et al. |
| 8,349,761 | B2 | 1/2013 | Xia et al. |
| 8,377,400 | B2 | 2/2013 | Schmieg et al. |
| 8,404,201 | B2 | 3/2013 | Qi et al. |
| 8,409,518 | B2 | 4/2013 | Kim et al. |
| 8,466,083 | B2 | 6/2013 | Schmieg et al. |
| 8,513,155 | B2 | 8/2013 | Li et al. |
| 8,513,158 | B2 | 8/2013 | Roldan Cuenya et al. |
| 8,535,632 | B2 | 9/2013 | Chase et al. |
| 8,539,760 | B2 | 9/2013 | Li et al. |
| 8,545,779 | B2 | 10/2013 | Blint et al. |
| 8,852,689 | B2 | 10/2014 | Srinivas et al. |
| 8,906,331 | B2 | 12/2014 | Koch et al. |
| 8,920,756 | B2 | 12/2014 | Koch et al. |
| 8,943,811 | B2 | 2/2015 | Li et al. |
| 8,959,894 | B2 | 2/2015 | Qi et al. |
| 8,992,869 | B2 | 3/2015 | Ratts et al. |
| 9,034,286 | B2 | 5/2015 | Bergeal et al. |
| 9,186,654 | B2 | 11/2015 | Qi et al. |
| 9,597,635 | B2 | 3/2017 | Qi et al. |
| 9,649,627 | B1 | 5/2017 | Xiao et al. |
| 9,732,687 | B2 | 8/2017 | Li et al. |
| 9,827,562 | B2 | 11/2017 | Qi et al. |
| 9,855,547 | B2 | 1/2018 | Qi et al. |
| 9,863,922 | B2 | 1/2018 | Qi et al. |
| 2002/0082163 | A1 | 6/2002 | Yan et al. |
| 2007/0207920 | A1 * | 9/2007 | Hirata ............. B01D 53/945 502/325 |
| 2008/0311753 | A1 | 12/2008 | Zheng et al. |
| 2009/0041645 | A1 | 2/2009 | Wassermann et al. |
| 2009/0247397 | A1 * | 10/2009 | Mashima ............ B01J 23/40 502/171 |
| 2010/0086832 | A1 | 4/2010 | Lopez et al. |
| 2010/0204518 | A1 | 8/2010 | Wolf et al. |
| 2010/0229533 | A1 | 9/2010 | Li et al. |
| 2010/0233045 | A1 | 9/2010 | Kim et al. |
| 2011/0223096 | A1 | 9/2011 | Wolf et al. |
| 2011/0245075 | A1 * | 10/2011 | Ohmura ............. B01D 53/945 502/325 |
| 2012/0036834 | A1 | 2/2012 | Qi et al. |
| 2012/0042631 | A1 | 2/2012 | Schmieg et al. |
| 2012/0047874 | A1 | 3/2012 | Schmieg et al. |
| 2012/0159927 | A1 | 6/2012 | Li et al. |
| 2012/0159935 | A1 | 6/2012 | Li et al. |
| 2013/0034472 | A1 | 2/2013 | Cantrell et al. |
| 2013/0294989 | A1 | 11/2013 | Koch et al. |
| 2013/0294990 | A1 | 11/2013 | Koch et al. |
| 2014/0041905 | A1 | 2/2014 | Srinivas et al. |
| 2014/0057781 | A1 | 2/2014 | Stamm Masias et al. |
| 2014/0170045 | A1 | 6/2014 | Fedeyko et al. |
| 2015/0231566 | A1 | 8/2015 | Xu et al. |
| 2015/0266014 | A1 | 9/2015 | Xue et al. |
| 2015/0361913 | A1 | 12/2015 | Qi et al. |
| 2016/0123945 | A1 | 5/2016 | Qi et al. |
| 2016/0149230 | A1 | 5/2016 | Debe et al. |
| 2016/0222852 | A1 | 8/2016 | Ren et al. |
| 2017/0095795 | A1 | 4/2017 | Xiao et al. |
| 2017/0095807 | A1 | 4/2017 | Xiao et al. |
| 2017/0114458 | A1 | 4/2017 | Xiao et al. |

FOREIGN PATENT DOCUMENTS

| | | | |
|---|---|---|---|
| CN | 102203921 A | 9/2011 | |
| CN | 103648643 A | 3/2014 | |
| CN | 103974759 | 8/2014 | |
| CN | 106560594 A | 4/2017 | |
| CN | 107970922 A | 5/2018 | |
| DE | 102016218366 A1 | 4/2017 | |
| DE | 102017124764 A1 | 4/2018 | |
| EP | 0695580 | 3/2003 | |
| GB | 2522978 | 8/2015 | |
| JP | 2002018242 | * 1/2002 | ............. F01N 3/10 |
| JP | 2006192357 | 7/2006 | |
| JP | 4269831 B2 | 5/2009 | |
| JP | 2009247968 | 10/2009 | |
| JP | 2011230104 | 11/2011 | |
| JP | 05747952 | 7/2015 | |
| JP | 05806536 | 11/2015 | |
| KR | 2011001004 | 1/2011 | |
| KR | 1092606 | 12/2011 | |
| WO | WO-2006115239 A1 | 11/2006 | |
| WO | WO-2006137579 A1 | 12/2006 | |
| WO | WO2007063615 | 6/2007 | |
| WO | WO2013182302 | 12/2013 | |

OTHER PUBLICATIONS

Chang, et al.; "Gasoline cold start concept (gCSC) technology for low temperature emission control"; SAE Int. J. Fuels Labr. 7(2); 2014 pp. 480-488.

Dai, et al.; "A sinter-resistant Catalytic system based on platinum nanoparticles supported on TiO2 nanofibers and covered by porous silica"; Angew. Chem.Int. Ed.; 2010; vol. 49 pp. 8165-8168.

Lu, et al.; "Coking- and sintering-resistant palladium catalysts achieved through atomic layer deposition" Science; 2012; vol. 335; No. 6073; pp. 1205-1208 Abstract Only.

Pan, et al. "Effect of alumina on structure and acidity of solid acid catalyst Pt—SO_4~(2-)/ZrO_2-Al_20_3"; Chinese Journal of Catalysis; 2005; Abstract Only.

Wang; "Fabrication and testing of low-temperature catalytically active washcoat materials for next-generation vehicle catalytic converters"; YSU-CTME; 2013; pp. 1-9.

Li, et al.; "A sintering-resistant Pd/SiO2 catalyst by reverse-loading nano iron oxide for aerobic oxidation of benzyl alcohol"; RSC Advances; 2015; vol. 5; pp. 4766-4769; Abstract Only.

Lu, et al.; A sinter-resistant catalytic system fabricated by maneuvering the selectivity of SiO2 deposition onto the Tio2 surface versus the pt nanoparticle surface Nano Lett.; 2013; vol. 13 (10); pp. 4957-4962; Abstract Only.

(56) References Cited

OTHER PUBLICATIONS

First Office Action for Chinese Patent Application No. 201610855487.0 dated Jun. 11, 2018 and correspondence from China Patent Agent (H.K.) Ltd. summarizing contents, 8 pages.

* cited by examiner

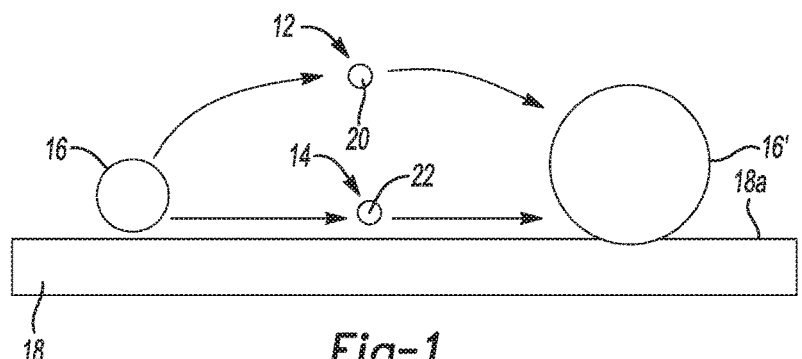
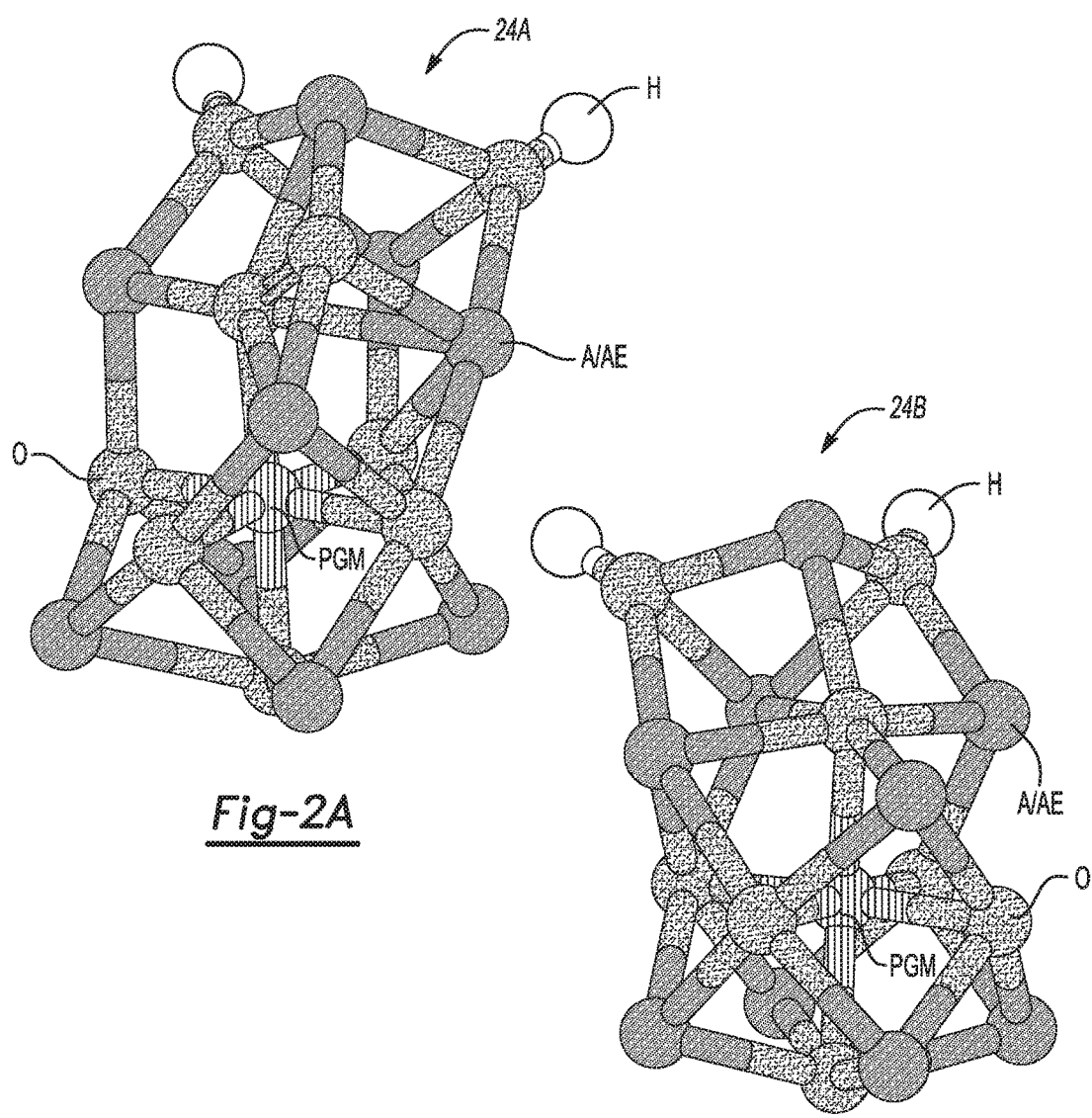
Fig-1
Fig-2A
Fig-2B

CATALYSTS WITH ATOMICALLY DISPERSED PLATINUM GROUP METAL COMPLEXES

INTRODUCTION

Vehicles with an Internal Combustion Engine (ICE) include an exhaust gas treatment system for treating the exhaust gas from the engine. The configuration of the treatment system depends, in part, upon whether the engine is a diesel engine (which typically operates with lean burn combustion and contains high concentrations of oxygen in the exhaust gases at all operating conditions) or a stoichiometric spark-ignited engine (which operates at a nearly stoichiometric air-to-fuel (A/F) ratio). The treatment system for the diesel engine includes a diesel oxidation catalyst (DOC), which is capable of oxidizing carbon monoxide (CO) and hydrocarbons (HC). The treatment system for the stoichiometric spark-ignited engine includes a three-way catalyst (TWC), which operates on the principle of non-selective catalytic reduction of $NO_x$ by CO and HC.

SUMMARY

A catalytic converter includes a catalyst. The catalyst includes a non-modified metal oxide support and platinum group metal (PGM) complexes atomically dispersed on the non-modified metal oxide support. The PGM complexes include a PGM species selected from the group consisting of an atom of a platinum group metal, a cluster including from 2 atoms to less than 10 atoms of the platinum group metal, and combinations thereof. An alkali metal or an alkaline earth metal is bonded to the PGM species. The alkali or alkaline earth metal is part of a structure including oxygen atoms and hydrogen atoms.

In an example of a method for forming a catalyst, atomically dispersed platinum group metal (PGM) complexes are formed on a non-modified metal oxide support. The atomically dispersed platinum group metal (PGM) complexes may be formed via various methods, some of which include co-impregnation and dry grinding.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a schematic illustration depicting two mechanisms for PGM particle growth or sintering;

FIGS. 2A-2D depict different examples of the PGM complexes disclosed herein;

DETAILED DESCRIPTION

Figure 2C:
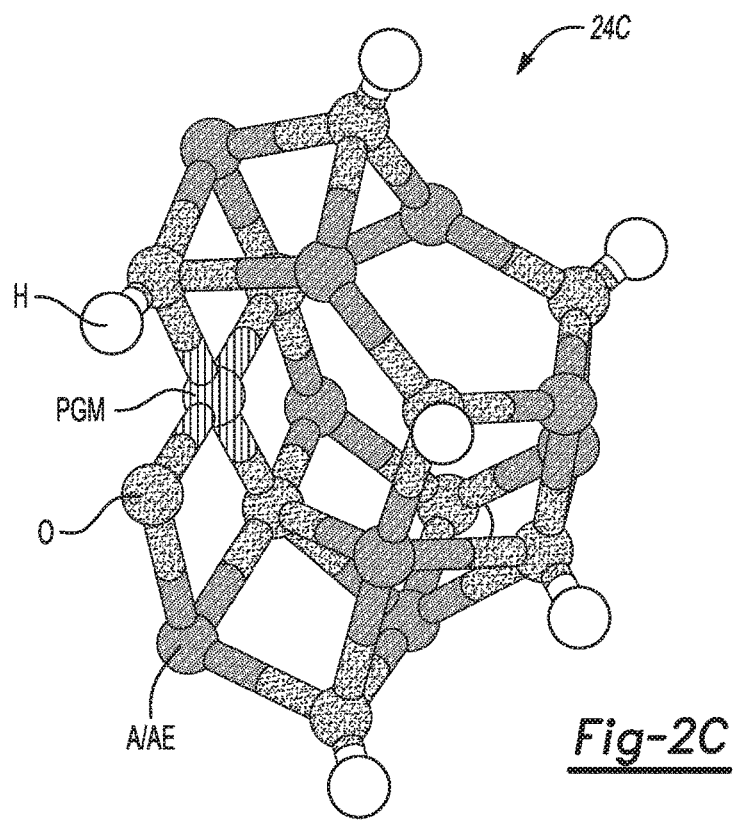
Figure 2D:
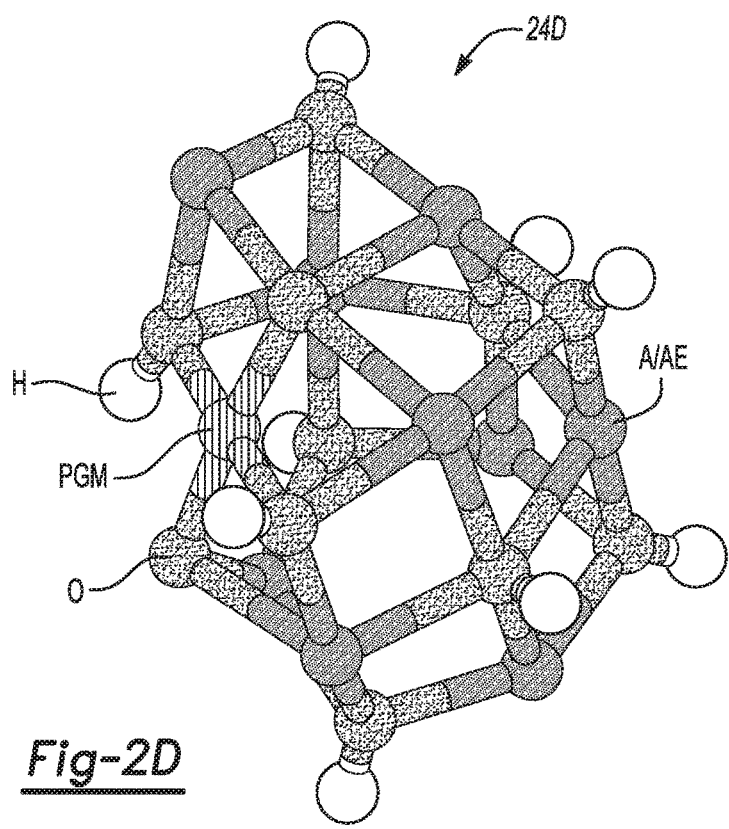
Figure 3:
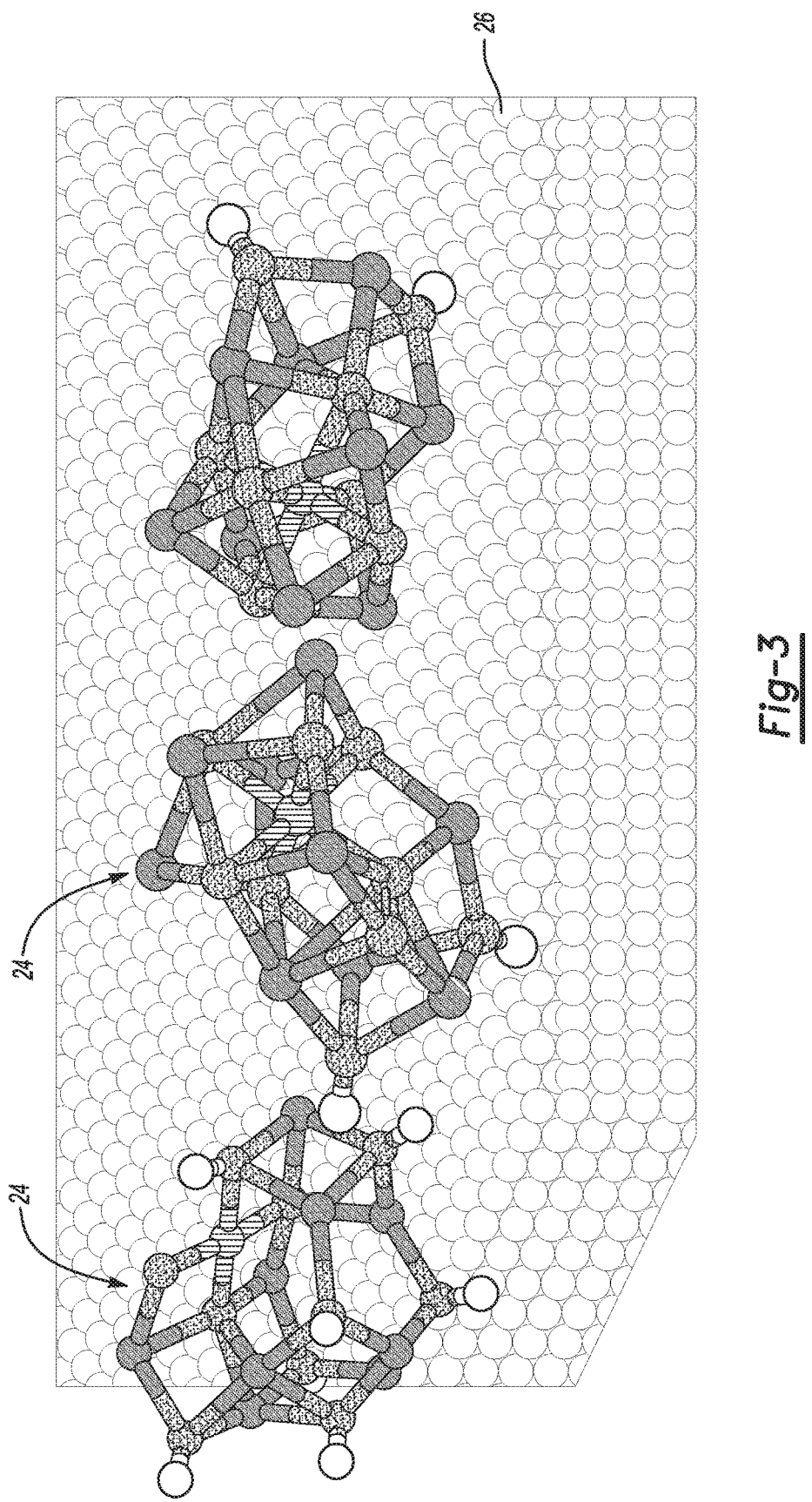
FIG. 3 is a schematic view of an example of the catalyst disclosed herein.

DOCs and TWCs often include a support loaded with a Platinum Group Metal (PGM) as the active catalytic/catalyst material. As the exhaust gas temperature from the vehicle engine increases (e.g., to temperatures ranging from 150° C. to about 1000° C.), the PGM loaded on the support may become unstable and experience growth (i.e., sintering). FIG. 1 depicts two mechanisms for PGM growth during vehicle operation. The mechanisms involve atomic and/or crystallite PGM migration. The first mechanism involves PGM migration via a vapor phase, denoted 12, and the second mechanism involves PGM migration via surface diffusion, denoted 14. In the first mechanism, a mobile species (not shown), emitted from the PGM species 16 loaded on the support 18, can travel through the vapor phase 12 and agglomerate with other metal particles 20 in the vapor phase 12 to form larger PGM particles 16' (e.g., nanoparticles, which have tens to thousands of atoms). In the second mechanism, a mobile species (not shown) emitted from the PGM species 16 can diffuse along the surface 18a of the support 18 and agglomerate with other metal particles 22 on the surface 18a to form larger PGM particles 16'. The second mechanism may involve Ostwald ripening, where the migration of the mobile species is driven by differences in free energy and local atom concentrations on the support surface 18a.

An increase in the size of the PGM particles 16' results in poor PGM utilization and undesirable aging of the catalyst material. More specifically, the increased particle size reduces the PGM dispersion, which is a ratio of the number of surface PGM atoms in the catalyst to the total number of PGM atoms in the catalyst. PGM particles 16' have many PGM atoms buried inside, which contribute little or nothing to the catalytic reaction. For example, in some PGM particles 16', greater than 80% of the atoms may be spectator catalytic species, or species that are not active catalytic reaction sites. A reduced PGM dispersion is directly related to a decrease in the active metal surface area (as a result of particle growth), and thus indicates a loss in active catalyst reaction sites, which equates to a decrease in catalyst activity. The loss in active catalyst reaction sites leads to poor PGM utilization efficiency, and indicates that the catalyst has undesirably been aged or deactivated.

In the examples disclosed herein, PGM complexes are formed which stabilize single PGM atoms or PGM clusters (including from 2 atoms to 10 atoms) with structures that contain alkali metal atoms or alkaline earth metal atoms, oxygen atoms, and hydrogen atoms. The stabilizing structure bonds directly to the PGM atom or cluster, and thus prevents the bound species from vapor or surface migration.

Stabilization of the smaller PGM unit (i.e., the single atom or a small cluster of atoms) may maximize the PGM efficiency, because the less-coordinated atoms are extremely active for CO and HC oxidation and $NO_x$ abatement. The PGM complexes disclosed herein slow down or prevent the PGM particle growth/sintering and maintain more active PGM sites over time, and thus the catalyst ages slower than catalysts without the stabilizing structure of the PGM complexes. Moreover, when sintering is reduced or prevented, the operational temperature of the catalyst is prevented from drifting upward over time.

The PGM complexes 24 disclosed herein include a PGM atom or a PGM cluster and the stabilizing structure bound to the PGM atom or one atom of the PGM cluster. The stabilizing structure consists of alkali metal atoms or alkaline earth metal atoms, oxygen atoms, and hydrogen atoms. Some examples of the PGM complexes 24 are shown in FIGS. 2A through 2D, and are respectively labeled A, B, C, and D. In each of FIGS. 2A through 2D, the PGM atom, labeled PGM, is striped, the oxygen atoms, one of which is labeled O, are speckled, the alkali metal atoms or alkaline earth metal atoms, one of which is labeled A/AE, are grey, and the hydrogen atoms, one of which is labeled H, are white.

The PGM atom or cluster may be selected from the group consisting of platinum atom(s), palladium atom(s), rhodium atom(s), ruthenium atom(s), osmium atom(s), or iridium atom(s). The alkali metal may be selected from the group consisting of lithium, sodium, potassium, rubidium, cesium, and francium. The alkaline earth metal may be selected from the group consisting of beryllium, magnesium, calcium, strontium, barium, and radium.

In each of the PGM complexes 24, A, B, C, D, the alkali metal atoms or alkaline earth metal atoms of the stabilizing structure are bound to the PGM atom or an atomic center of the PGM cluster through oxygen atoms (or oxygen linkages). In some examples, such as PGM complexes 24, A and 24, B, one oxygen atom links each of the alkali or alkaline earth metal atoms to the PGM atom or atomic center of the PGM cluster. In other examples, such as PGM complexes 24, C and 24, D, some of the alkali or alkaline earth metal atoms are linked to the PGM atom or atomic center of the PGM cluster via one oxygen atom, while other alkali or alkaline earth metal atoms have several atoms (e.g., two oxygen atoms and another alkali or alkaline earth metal atom) between itself and the PGM atom or atomic center of the PGM cluster.

In the PGM complexes 24, the mole ratio of the PGM species to the alkali or alkaline earth metal atoms ranges from 1:3 to 1:10. In an example, the mole ratio of the PGM species to the alkali or alkaline earth metal atoms ranges from 1:5 to 1:10. The number of oxygen and/or hydrogen atoms present in the PGM complexes 24 may vary in order to balance the zero charge of the complexes 24.

PGM complex 24, A includes nine oxygen atoms O, nine alkali or alkaline earth metal atoms A/AE, and two hydrogen atoms H. PGM complex 24, B includes eight oxygen atoms O, nine alkali or alkaline earth metal atoms A/AE, and two hydrogen atoms H. PGM complex 24, C includes ten oxygen atoms O, nine alkali or alkaline earth metal atoms A/AE, and seven hydrogen atoms H. PGM complex 24, D includes eleven oxygen atoms O, nine alkali or alkaline earth metal atoms A/AE, and nine hydrogen atoms H. While these complexes show the single PGM atom PGM, it is to be understood that this atom could be part of a cluster.

While several examples of the PGM complexes 24, A, B, C, D are shown, it is to be understood that the stabilizing structure may include any number of alkali metal atoms or alkaline earth metal atoms A/AE, oxygen atoms O, and hydrogen atoms H.

Examples of the catalyst 10 include the PGM complexes 24 atomically dispersed on a non-modified metal oxide support structure 26. By atomically dispersed, it is meant that the PGM complexes 24, A, B, C, D are spread over the non-modified metal oxide support structure so that the PGM atoms and PGM clusters of the PGM complexes 24, A, B, C, D are generally not agglomerated together in particle form. The PGM complexes 24, A, B, C, D may be bonded (physically and/or chemically) to the surface 26a of the non-modified metal oxide support structure 26, and may also be present within the pores (not shown) of the non-modified metal oxide support structure 26.

The catalyst 10 contains from greater than 0 wt % to about 5 wt % of the PGM species (i.e., PGM atoms or PGM clusters) based on the total weight of the catalyst 10.

The non-modified metal oxide support structure 26 is selected from the group consisting of $Al_2O_3$, $CeO_2$, $ZrO_2$, $CeO_2$—$ZrO_2$, $SiO_2$, $TiO_2$, ZnO, zeolites, perovskite materials (e.g., $La_{0.9}FeO_3$, $LaFeO_3$, $LaAlO_3$, Sr-promoted $LaFeO_3$, Ce-promoted $LaFeO_3$, $LaMnO_3$, or $LaCoO_3$), and combinations thereof. The non-modified support does not have certain oxide domains mitigated by a trace amount of a heteroatom component.

The non-modified metal oxide support structure 26 may be in the form of a powder, spheres, or any other suitable configuration. The non-modified metal oxide support structure 26 may include several small pores. More pores increase the surface area to fit many PGM complexes 24, A, B, C, D in a small volume. In an example, the pore volume of the non-modified metal oxide support structure 26 ranges from about 0.5 ml/g to about 2 ml/g.

To form the catalyst 10, atomically dispersed PGM complexes 24 are formed on the non-modified metal oxide support 26. The PGM species precursor, the alkali metal precursor or the alkaline earth metal precursor, and the method are selected so that PGM-$O_x$-M linkages form (where M is the alkali or alkaline earth metal atom, and x=1-6). In some examples, x may range from 2 to 4. The alkali metal or the alkaline earth metal species should bridge easily to the PGM atom or the atomic center of one atom of the PGM cluster during the catalyst preparation. In the examples disclosed herein, the alkali or alkaline earth ions do not modify the metal oxide support 26 at any characterization noticeable level, but rather, they bring the PGM species into the desired configuration with the stabilizing structure. Some of the PGM species may also bond to the non-modified metal oxide support structure 26 through an oxygen linkage (e.g., PGM-$O_x$-S, where S is the support structure 26 and x=1-6, or in some instances, x=2-4).

In one example of the method to form the catalyst 10, a platinum precursor and an alkali metal precursor are used. Examples of the platinum precursor include tetraammineplatinum (II) nitrate, tetraammineplatinum (II) chloride, tetraammineplatinum (II) hydroxide, chloroplatinic acid, platinum nitrate, platinum acetate, and dinitrodiamine platinum. Examples of the alkali metal precursor include potassium hydroxide, potassium nitrate, lithium hydroxide, lithium nitrate, sodium hydroxide, sodium nitrate, rubidium hydroxide, rubidium nitrate, cesium hydroxide, cesium nitrate, francium hydroxide, francium nitrate, and combinations thereof.

In this example method, the platinum precursor and the alkali metal precursor are co-impregnated on the non-modified metal oxide support 26. The co-impregnation method may be a dry (or incipient wetness) co-impregnation process or a wet co-impregnation process. Either of these co-impregnations utilizes a co-precursor solution. The co-precursor solution may be an aqueous solution containing water, the platinum precursor, and the alkali metal precursor. These particular precursors will not precipitate out of the solution.

The concentration of the precursor solution depends upon the desired loading of the PGM species and the alkali metal on the support 26 and in the catalyst 10. For example, 10 g total of the catalyst 10 with 1.5% platinum and 7.5% alkali metal equates to 0.15 g platinum (i.e., 1.5% of 10 g) and 0.75 g alkali metal (i.e., 7.5% of 10 g). The mass ratio of pure platinum to platinum precursor may be used to determine how much of the platinum precursor should be used to achieve the desired mass of platinum for the catalyst 10. The mass ratio of pure alkali metal to alkali metal precursor may be used to determine how much of the alkali metal precursor should be used to achieve the desired mass of alkali metal for the catalyst 10. The total amount of water added to make the aqueous solution depends upon the type of co-impregnation. For dry impregnation, the total amount of water added to make the aqueous solution depends upon the volume of water that will fill the pore volume, i.e., achieve incipient wetness. For wet impregnation, the total amount of water added to make the aqueous solution depends upon the solubility of the precursors. The solution of this example may be added to 9.1 g of dried support 26 (i.e., 10 g total−0.15 g platinum−0.75 g alkali metal=g support).

For dry impregnation, the co-precursor solution is added to the support 26 until all of the pores of the support 26 are filled with the solution. No additional solution is added beyond the amount needed to fill the pores (i.e., incipient wetness). Capillary action draws the precursor solution into the pores.

For wet impregnation, the support 26 is first filled with the same solvent (e.g., water) that is used for the co-precursor solution. The wetted support 26 is then treated with the co-precursor solution. In this example, high pressure is not developed in the pores of the support 18, but rather the precursors migrate progressively from the co-precursor solution into the pores.

The co-impregnated support is then exposed to drying to remove the water and calcining to convert the platinum precursor to the platinum species (i.e., single atom or cluster) and the alkali metal precursor to the stabilizing structure (having the alkali metals bound to the platinum species via oxygen linkages). Drying may be performed in air at a temperature ranging from about room temperature (e.g., 18° C. to about 25° C.) to about 150° C. for a time period ranging from about 12 hours to about 24 hours, and calcining may be performed at a temperature ranging from about 300° C. to about 650° C. for a time period ranging from about 1 hour to about 4 hours. In an example, calcining is performed at about 550° C. for about 2 hours. This process decomposes the platinum and alkali metal precursors and forms the PGM complexes 24 both within the pores of the support 26 and on at least some of the surface of the support 26.

In another example of the method to form the catalyst 10, any PGM precursor and any alkali metal precursor or alkaline earth metal precursor are used. The PGM precursor may be selected from the group consisting of tetraammineplatinum (II) nitrate, tetraammineplatinum (II) chloride, tetraammineplatinum (II) hydroxide, chloroplatinic acid ($H_2PtCl_6$), platinum nitrate, platinum acetate, dinitrodiamine platinum, palladium nitrate, palladium acetate, bis-acetylacetonato palladium, rhodium nitrate, rhodium acetate, hexachloroiridic acid hexhydrate ($H_2IrCl_6.6H_2O$), ruthenium (III) chloride, ruthenium (III) acetylacetonate, ruthenium (II) hexa-ammine dichloride, ruthenium (III) hexa-ammine trichloride, osmium (III) chloride hydrate, ammonium hexachloroosmate (IV), iridium (IV) chloride, ammonium hexachloroiridate, iridium (III) chloride, iridium sulfate, and combinations thereof. The alkali metal precursor may be selected from the group consisting of potassium hydroxide, potassium nitrate, lithium hydroxide, lithium nitrate, sodium hydroxide, sodium nitrate, rubidium hydroxide, rubidium nitrate, cesium hydroxide, cesium nitrate, francium hydroxide, francium nitrate, and combinations thereof or the alkaline earth metal precursor may be selected from the group consisting of barium hydroxide, barium nitrate, magnesium hydroxide, magnesium nitrate, beryllium hydroxide, beryllium nitrate, calcium hydroxide, calcium nitrate, strontium hydroxide, strontium nitrate, radium hydroxide, radium nitrate, and combinations thereof.

In this example of the method, sequential impregnation is utilized with drying in between each impregnation. Without drying, the impregnation of the second precursor could wash away the first precursor. Drying also takes place at a temperature that is below calcination temperatures of the precursors. If the precursors were calcined separately (i.e., immediately following their respective impregnations), the alkali or alkaline earth metals would be more likely to stay in their cationic form and not bind to the PGM species. In these instances, the PGM species and the alkali or alkaline earth metals will remain separate and not form the complexes disclosed herein.

This example of the method involves impregnating one of the precursors, either i) the PGM precursor or ii) the alkali metal precursor or alkaline earth metal precursor, on the non-modified metal oxide support 26 to form an impregnated non-modified metal oxide support.

This impregnation step may be a dry (or incipient wetness) impregnation process or a wet impregnation process. Either of these impregnations utilizes a PGM precursor solution (if the PGM precursor is to be loaded first) or an alkali metal precursor solution or an alkaline metal precursor solution (if the alkali metal precursor or alkaline earth metal precursor is to be loaded first).

The PGM precursor solution may be an aqueous solution containing water and the PGM precursor. The concentration of the PGM precursor solution depends upon the desired loading of the PGM species in the catalyst 10. For example, 10 g total of the catalyst 10 with 1.5% palladium equates to 0.15 g palladium (i.e., 1.5% of 10 g). The mass ratio of pure palladium to palladium precursor may be used to determine how much of the platinum precursor should be used to achieve the desired mass of palladium for the catalyst 10.

The alkali metal precursor solution may be an aqueous solution containing water and the alkali metal precursor. The alkaline earth metal precursor solution may be an aqueous solution containing water and the alkaline metal precursor. The concentration of the alkali metal precursor solution or alkaline earth metal precursor solution depends upon the desired loading of the alkali metal or the alkaline earth metal on the support 26 and in the catalyst 10. For example, 10 g total of the catalyst 10 with 8.5% alkali metal or alkaline earth metal equates to 0.85 g alkali metal or alkaline earth metal (i.e., 8.5% of 10 g). The mass ratio of pure alkali metal to alkali metal precursor or pure alkaline earth metal to alkaline earth metal precursor may be used to determine how much, respectively, of the alkali metal precursor or the alkaline earth metal precursor should be used to achieve the desired mass of alkali metal for the catalyst 10.

The total amount of water added to make the PGM precursor solution or the alkali metal precursor solution or the alkaline metal precursor solution depends upon the type of impregnation. For dry impregnation, the total amount of water added to make the aqueous solution depends upon the volume of water that will fill the pore volume, i.e., achieve incipient wetness. For wet impregnation, the total amount of water added to make the aqueous solution depends upon the solubility of the respective precursors.

The PGM precursor solution or the alkali metal precursor solution or the alkaline earth metal precursor solution is added to the dried support 26 to perform dry impregnation or wet impregnation as previously described. This process forms an impregnated non-modified metal oxide support.

The impregnated non-modified metal oxide support is dried at a temperature below the calcination temperature of the PGM precursor or the alkali metal precursor or the alkaline earth metal precursor (whichever one precursor has been impregnated at this point). Examples of suitable drying temperatures (that are below the calcination temperature) range from about room temperature to about 120° C. In an example, the drying temperature is about 80° C.

This example of the method then involves impregnating the other of the precursors that has not yet been impregnated. For example, if the PGM precursor is already loaded on the support 26, then this impregnation will load the alkali metal precursor or the alkaline earth metal precursor. This impregnation will utilize the alkali metal precursor solution or the alkaline earth metal precursor solution as previously described. Alternatively, if the alkali metal precursor or the alkaline earth metal precursor is already loaded on the support 26, then this impregnation will load the PGM precursor. This impregnation will utilize the PGM precursor solution as previously described. This impregnation process results in a co-impregnated non-modified metal oxide support.

The co-impregnated non-modified metal oxide support is dried at a temperature below the calcination temperature of the PGM precursor and the alkali metal precursor or the alkaline earth metal precursor (because both precursors have been impregnated at this point).

The co-impregnated non-modified metal oxide support is then calcined. In this example, calcination takes place at a temperature ranging from about 350° C. to about 550° C. for a time ranging from about 2 hours to about 10 hours. This process decomposes both the PGM precursor and the alkali metal precursor or the alkaline earth metal precursor and forms the PGM complexes 24 both within the pores of the support 26 and on at least some of the surface of the support 26.

In still another example of the method, solid state impregnation is utilized to introduce the alkali metal or the alkaline earth metal precursors. This method avoids the use the alkali metal precursor solution and the alkaline earth metal precursor solution.

In the solid state impregnation method, any PGM precursor and any alkali metal precursor or alkaline earth metal precursor may be used. To reiterate, the PGM precursor may be selected from the group consisting of tetraammineplatinum (II) nitrate, tetraammineplatinum (II) chloride, tetraammineplatinum (II) hydroxide, chloroplatinic acid, platinum nitrate, platinum acetate, dinitrodiamine platinum, palladium nitrate, palladium acetate, bis-acetylacetonato palladium, rhodium nitrate, rhodium acetate, hexachloroiridic acid hexhydrate, ruthenium (III) chloride, ruthenium (III) acetylacetonate, ruthenium (II) hexa-ammine dichloride, ruthenium (III) hexa-ammine trichloride, osmium (III) chloride hydrate, ammonium hexachloroosmate (IV), iridium (IV) chloride, ammonium hexachloroiridate, iridium (III) chloride, iridium sulfate, and combinations thereof; the alkali metal precursor may be selected from the group consisting of potassium hydroxide, potassium nitrate, lithium hydroxide, lithium nitrate, sodium hydroxide, sodium nitrate, rubidium hydroxide, rubidium nitrate, cesium hydroxide, cesium nitrate, francium hydroxide, francium nitrate, and combinations thereof; and the alkaline earth metal precursor may be selected from the group consisting of barium hydroxide, barium nitrate, magnesium hydroxide, magnesium nitrate, beryllium hydroxide, beryllium nitrate, calcium hydroxide, calcium nitrate, strontium hydroxide, strontium nitrate, radium hydroxide, radium nitrate, and combinations thereof.

In this example of the method, the PGM precursor is dispersed on and in the non-modified metal oxide support 26 by an impregnation method. This impregnation may be a dry (or incipient wetness) impregnation process or a wet impregnation process. Either of these impregnations utilizes the previously described PGM precursor solution.

After PGM precursor impregnation, the impregnated support is dried to remove the water and to form a powder. Drying may be accomplished in air at room temperature (e.g., ranging from about 18° C. to about 25° C.) for a time ranging from about 7 hours to about 12 hours.

The powder is then ground together with the alkali metal precursor or the alkaline earth metal precursor (which, in this example, is not in the form of a precursor solution). The amount of powder and precursor that are ground together may be based on the desired mole ratio of the PGM species to the alkali metal or the alkaline earth metal that is to be present in the catalyst 10. As mentioned herein, the ratio of PGM species to alkali or alkaline earth metal may range from 1:3 to 1:10. In some examples, this ratio ranges from 1:5 to 1:10.

Grinding of the power and the alkali metal precursor or the alkaline earth metal precursor may be a dry grinding process, which forms a powder mixture. During dry grinding, the temperature of the powder ranges from about 18° C. to about 80° C., or in some instances, to about 70° C. Dry grinding may take place for a time ranging from about 15 minutes to about 10 hours. Dry grinding may be accomplished by small-scale manual grinding, or with a grinding machine (e.g., mills, bead mills, attritors, etc.).

The powder mixture is then dried at a temperature ranging from about 18° C. to about 80° C. for a time ranging from about 8 hours to about 12 hours. The dried powder mixture is then calcined as previously described.

In the previously described examples (e.g., co-impregnation, sequential impregnation, and solid state impregnation), it is to be understood that calcination may be used to form the PGM complexes 24 and to burn off extra radicals (e.g., nitrate, acetate, ammonia, etc.) that may be bound to the PGM complex 24.

In yet another example of the method, the PGM complexes 24 are formed prior to being dispersed in and on the non-modified metal oxide support 26. This example method utilizes precursors and solvents that contain the PGM species, the alkali or alkaline earth metal, oxygen, and hydrogen alone, so that additional radicals are not present in the resulting PGM complex 24. In this example then, the PGM precursor is a PGM oxide (e.g., PdO, $PtO_2$, $RuO_2$, $RhO_2$ or $Rh_2O_3$, $OsO_2$, $IrO_2$) or a PGM hydroxide (e.g., $Pd(OH)_2$, $Pt(OH)_4$, $Ru(OH)_3$, $Rh(OH)_3$, $Os(OH)_4$, $Ir(OH)_3$), and the alkali metal precursor or alkaline earth metal precursor is an alkali metal hydroxide or an alkaline earth metal hydroxide).

Examples of the alkali metal hydroxide precursor include: potassium hydroxide, lithium hydroxide, sodium hydroxide, rubidium hydroxide, cesium hydroxide, francium hydroxide, and combinations thereof and examples of the alkaline earth metal hydroxide precursor include: barium hydroxide, magnesium hydroxide, beryllium hydroxide, calcium hydroxide, strontium hydroxide, radium hydroxide, and combinations thereof.

To form the PGM complexes 24, an aqueous solution of the PGM oxide or the PGM hydroxide is first prepared. The concentration of the PGM oxide or the PGM hydroxide is based on the desired loading of the PGM species in the catalyst 10, and may be determined as previously described. This aqueous solution is heated up to a temperature of about 80° C., and the alkali metal hydroxide or the alkaline earth metal hydroxide is mixed into the aqueous solution at this temperature. The amount of alkali metal hydroxide or alkaline earth metal hydroxide that is added may be based on the desired mole ratio of the PGM species to the alkali metal or the alkaline earth metal that is to be present in the catalyst 10. As mentioned herein, the ratio of PGM species to alkali or alkaline earth metal may range from 1:3 to 1:10. In some examples, this ratio ranges from 1:5 to 1:10. After addition of the alkali metal hydroxide or the alkaline earth metal hydroxide, the aqueous solution may be refluxed at the same temperature for a time ranging from about 7 hours to about 12 hours. As a result of this process, the PGM complexes 24 form in the aqueous solution.

The following is one example of how the PGM complexes 24 may be formed via this example of the method. A designated amount of PdO or Pd(OH)$_2$ is slurried in about 30 mL of water with N$_2$ sparging. This solution is heated up to 80° C. NaOH powder (molar ratio of Pd:Na=1:10) is added into the slurry at the same temperature. The mixture is refluxed at 80° C. overnight, and a transparent solution is formed. When lower concentrations of the alkali/alkaline earth metal, the transparent solution may be colorless, and at higher concentrations of the alkali/alkaline earth metal, the transparent solution may be light yellow. This solution does not precipitate at 80° C. with continued stirring.

The solution containing the PGM complexes 24 may then be used to impregnate the PGM complexes 24 on the non-modified metal oxide support 26. This impregnation process may be dry or wet impregnation, depending upon the total amount of water in the solution and the pore volume of the non-modified metal oxide support 26.

The impregnated support may then be dried. Drying may be accomplished in air at a temperature ranging from about room temperature (e.g., 18° C. to about 25° C.) to about 150° C. for a time period ranging from about 12 hours to about 24 hours.

In this example of the method, calcination may or may not be used, because the PGM complexes 24 are already formed and there are no extra radicals present that require removal. If performed, calcination may take place at a temperature ranging from about 300° C. to about 650° C. for a time period ranging from about 1 hour to about 4 hours. Performing calcination in this example of the method may be desirable when the catalyst 10 is to be used in an application where the catalyst operation temperature is low (e.g., about 100° C.). At low operation temperatures, the catalyst 10 may experience diffusion issues due to water molecules that may stick to the internal pores of the catalyst 10. Performing calcination prior to operational use can remove the water molecules, and thus reduce the potential for diffusion limitations of the catalyst.

In any of the methods disclosed herein, before the PGM complexes 24 are loaded on the non-modified metal oxide support 26, it is to be understood that the non-modified metal oxide support 26 may be exposed to a process that reduces its surface area. Reducing the surface area of the support 26 prior to forming the catalyst 10 means that there may be less of the surface 26 available for the PGM complexes 24. Fewer PGM complexes 24 reduce the weight increase of the final catalyst 10.

In one example of the support 26 pretreatment, the non-modified metal oxide support 26 is calcined at a temperature ranging from about 350° C. to about 450° C. for a time ranging from about 9 hours to about 11 hours. In another example of the support 26 pretreatment, the non-modified metal oxide support 26 is heated in vacuum at a temperature ranging from about 60° C. to about 80° C. for a time ranging from about 10 hours to about 72 hours.

Figure 4A:
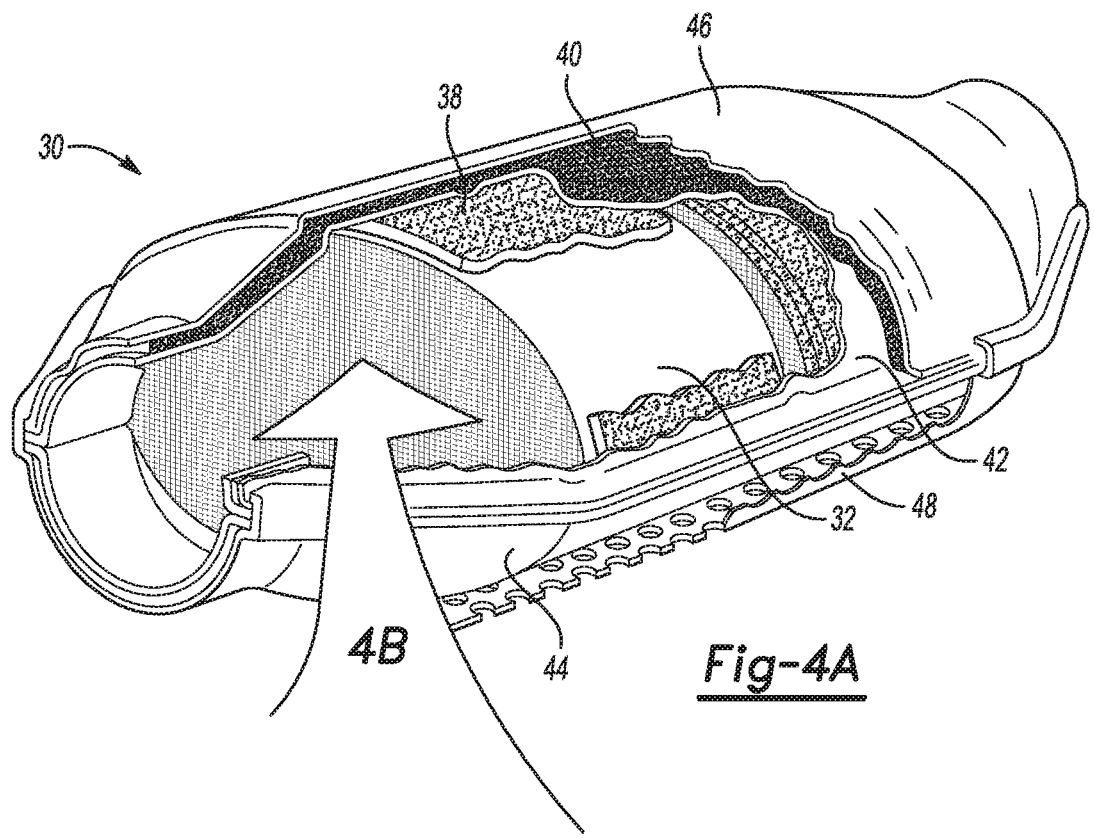
FIG. 4A is a perspective, partially cut-away view of an example of a catalytic converter.

The catalyst 10 may be formed via the method(s) disclosed herein, and then may be applied to a monolith substrate and utilized in a catalytic converter. An example of the catalytic converter 30 is shown in FIG. 4A, and an example of the monolith substrate 32 is shown in both FIGS. 4A and 4B.

The catalytic converter 30 includes the monolith substrate 32. The monolith substrate 32 may be formed of a ceramic or a metal alloy that is capable of withstanding high temperatures (e.g., 100° C. or higher). Synthetic cordierite is a magnesium-alumino-silicate ceramic material that is suitable for use as the monolith substrate 32. A ferritic iron-chromium-aluminum alloy is an example of a metal alloy that is suitable for use as the monolith substrate 32. The monolith substrate 32 has a honeycomb or other three-dimensional structure.

Figure 4B:
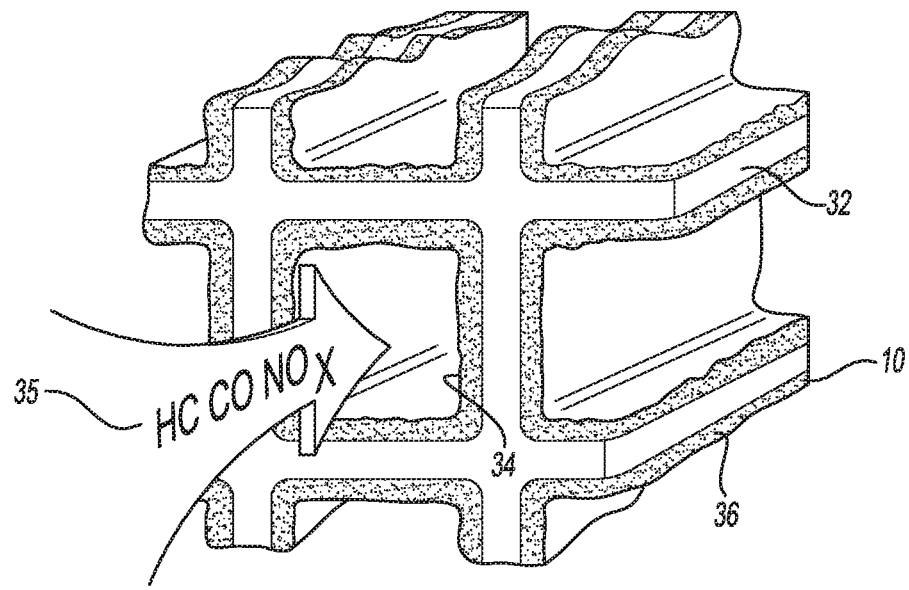
FIG. 4B is an enlarged view of a portion of FIG. 4A.

An enlarged view of a portion of the monolith substrate 32 is depicted in FIG. 4B. The monolith substrate 32 includes a large number of parallel flow channels 34 to allow for sufficient contact area between the exhaust gas 35 and the catalyst 10 (contained in coating 36) without creating excess pressure losses.

The coating 36 includes the catalyst 10 disclosed herein. In some instances, the coating 36 may also include a binder material (e.g., sol binders or the like). The coating 36 may be applied to the monolith substrate 32 by washcoating or some other similar processes.

Referring back to FIG. 4A, in the catalytic converter 30, the monolith substrate 32 is surrounded by a mat 38, which in turn is surrounded by insulation 40. Upper and lower shells 42, 44 (formed of metal) may be positioned between the mat 38 and the insulation 40. An insulation cover 46 may be positioned over the upper shell 42 and the insulation 40 thereon, and a shield 48 may be positioned adjacent to the lower shell 44 and the insulation 40.

The catalytic converter 30 may be a DOC, which is used in a diesel engine. The DOC is a two way catalytic converter, which eliminates hydrocarbons and CO by oxidizing them, respectively, to water and $CO_2$. The DOC may also exhibit $NO_x$ storage capability during the vehicle cold-start period. In such diesel engines, the reduction of $NO_x$ to water and $N_2$ may take place in a separate unit, and may involve the injection of urea into the exhaust.

The catalytic converter 30 may also be a TWC, which is used in a stoichiometric spark-ignited engine. The TWC is a three way catalytic converter, which reduces NOx to $N_2$, and oxidizes HC and CO, respectively, to water and $CO_2$.

To further illustrate the present disclosure, examples are given herein. It is to be understood that this example is provided for illustrative purposes and is not to be construed as limiting the scope of the present disclosure.

EXAMPLE 1

This example was performed to test the effect of a potassium-containing stabilizing structure on platinum dispersion.

Comparative Sample 1 included an alumina support with platinum metal loaded thereon during an impregnation process. During this process, an aqueous solution of tetraammineplatinum (II) nitrate was added to alumina powder until all of the pores of the alumina powder were filled. The designed loading for Pt was 1.5 wt. %. Excess solution was not added. The impregnated powders were dried in a dark vacuum at room temperature overnight, and then were calcined in air at 350° C. to 550° C. for 2 to 4 hours to form the platinum metal species on the alumina support.

Sample 2 included an alumina support with the PGM complexes loaded thereon during a co-impregnation process. During this process, an aqueous solution of tetraammineplatinum (II) nitrate and potassium hydroxide was added to alumina powder until all of the pores of the alumina powder were filled. The designed loading for Pt was 1.4 wt. %, and the Pt:K atomic ratio was 1:5 to 1:10 in mole. Excess solution was not added. The impregnated powders were dried in a dark vacuum at room temperature overnight, and then were calcined in air at 350° C. to 550° C. for 2 to 4 hours to form the PGM complexes on the alumina support.

Comparative Sample 1 and Sample 2 were exposed to an aging process. The aging process involved exposing the samples to 650° C. for 2 hours in air with 10 vol. % water added.

The platinum dispersion (i.e., the ratio of the number of surface Pt atoms to the total number of Pt atoms) for Comparative Sample 1 and Sample 2 before aging (i.e., fresh samples, "F" in FIG. 5) and after aging (i.e., "A" in FIG. 5) was determined by chemisorption. Using chemisorption, the adsorption of a molecule (like CO or $H_2$) onto the PGM metal is measured. This measurement and the total mass of PGM in the sample enables the determination as to how much PGM is on the surface. Generally, the higher the dispersion, the higher the PGM utilization efficiency during catalyst operation.

Figure 5:
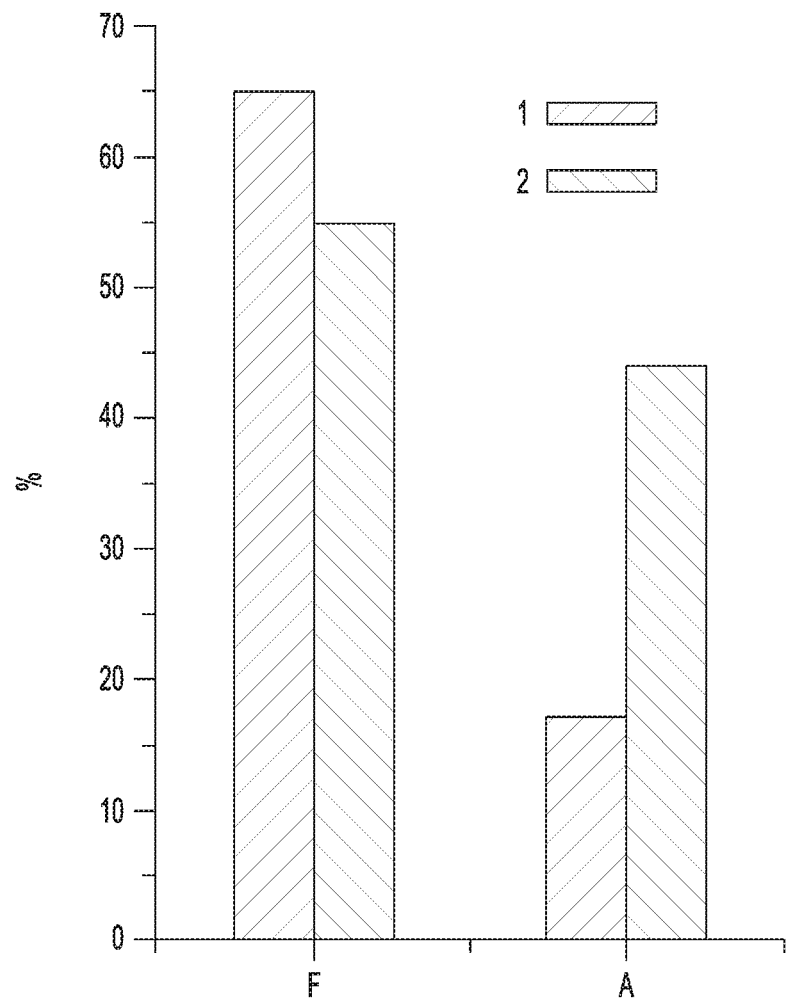
FIG. 5 is a graph depicting the platinum dispersion (i.e., the ratio of the number of surface metal atoms to the total number of metal atoms, shown as a percentage on the Y-axis) for a baseline example (1) and an example including the PGM complexes disclosed herein (2) when freshly prepared (F) and after aging (A)

The platinum dispersion results are shown in FIG. 5. As depicted, Comparative Sample 1 (labeled "1", no potassium-containing stabilizing structure) had a platinum dispersion of about 65% when fresh and about 17% after aging, while Sample 2 (labeled "2") had a platinum dispersion of about 55% when fresh and about 45% after aging. The aging results of Comparative Sample 1 are significantly reduced compared to the aging results of Sample 2. These results indicate that the non-stabilized platinum of Comparative Sample 1 had undergone sintering and particle growth. As such, the catalyst of Comparative Sample 1 had a reduced number of surface Pt atoms available for catalysis after aging, when compared to Sample 2.

Comparative Sample 1 and Sample 2 were then exposed to exhaust gas (containing 5000 ppm CO, 5% $H_2O$, and $N_2$ balance) at an inlet temperature that was ramped up at a rate of 2° C. per minute (from 100° C. to 350° C.). The space velocity (SV) was 1,500,000 $cm^3$ $g_{catalyst}^{-1}$ $h^{-1}$, where space velocity refers to the quotient of the entering volumetric flow rate of the reactants divided by the reactor volume (or the catalyst bed volume) in a unit time. The conversion of CO was determined.

Figure 6:
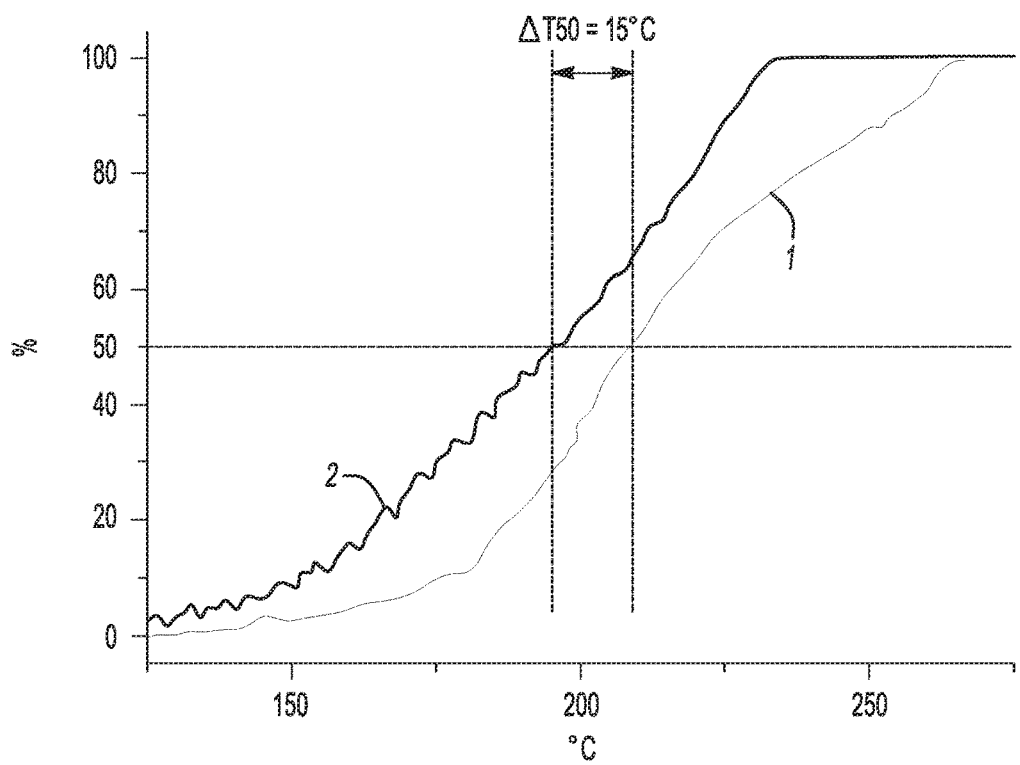
FIG. 6 is a graph depicting the carbon monoxide (CO) conversion (shown as a percentage on the Y-axis) as a function of temperature (shown as ° C. on the X-axis) for the aged baseline example (1) and the aged example including the PGM complexes disclosed herein (2)

FIG. 6 is a plot of percent conversion of CO (%, Y axis) as a function of inlet temperature in ° C. (X axis). Line 1 illustrates the CO oxidation by, or CO conversion for, Comparative Sample 1, and Line 2 illustrates the CO oxidation by, or CO conversion for, Sample 2. FIG. 6 specifically shows the CO conversion at $T_{50}$, which is the temperature at which 50% conversion is achieved. The lower $T_{50}$, the better. As depicted, there is a considerable decrease in the light-off temperature (at $T_{50}$) when the platinum is stabilized with the potassium-containing stabilizing structure (Sample 2). The drop in the light-off temperature ($\Delta T=15°$ C.) for Sample 2 (as compared to Comparative Sample 1) is advantageous, in part, because the catalyst is capable of CO oxidation activity at lower temperatures. This is also expected to translate into significantly lower PGM loadings (~50%) required for the same performance, which may lead to a reduction in cost of the precious metals used in the catalyst.

EXAMPLE 2

Comparative Samples 3 and 4 included an alumina support with different amounts of platinum metal loaded thereon during an impregnation process. During this process, an aqueous solution of tetraammineplatinum (II) nitrate was added to alumina powder until all of the pores of the alumina powder were filled. For Comparative Sample 3, the designed loading for Pt was 1.5 wt. %, and for Comparative Sample 4, the designed loading for Pt was 0.5 wt. %. Excess solution was not added. The impregnated powders were dried in a dark vacuum at room temperature overnight, and then were calcined in air at 350° C. to 550° C. for 2 to 4 hours to form the platinum metal species on the alumina support.

Sample 5 included an alumina support with PGM complexes loaded thereon during a co-impregnation process. During this process an aqueous solution of tetraammineplatinum (II) nitrate and potassium hydroxide was added to alumina powder until all of the pores of the alumina powder were filled. The designed loading for Pt was 0.4 wt. %, and the Pt:K atomic ratio was 1:5 to 1:10 in mole. Excess solution was not added. The impregnated powders were dried in a dark vacuum at room temperature overnight, and then were calcined in air at 350° C. to 550° C. for 2 to 4 hours to form the PGM complexes on the alumina support.

Sample 6 included an alumina support with PGM complexes loaded thereon during a solid state impregnation process. During this process, an aqueous solution of chloroplatinic acid was added to alumina powder until all of the pores of the alumina powder were filled. The designed loading for Pt was 0.4 wt. %. Excess solution was not added. The impregnated powders were dried in air at room temperature overnight. The dried powder was then ground together with a designated amount of barium nitrate (Pt:Ba=1:5 to 1:10 in mole) at room temperature for about 30 minutes. The obtained mixture was dried in a dark vacuum at room temperature overnight, and then was calcined in air at 350° C. to 550° C. for 2 to 4 hours to form the PGM complexes on the alumina support.

Comparative Samples 3 and 4 and Samples 5 and 6 were exposed to an aging process. The aging process involved exposing the samples to 650° C. for 2 hours in air with 10 vol. % water added.

Figure 7:
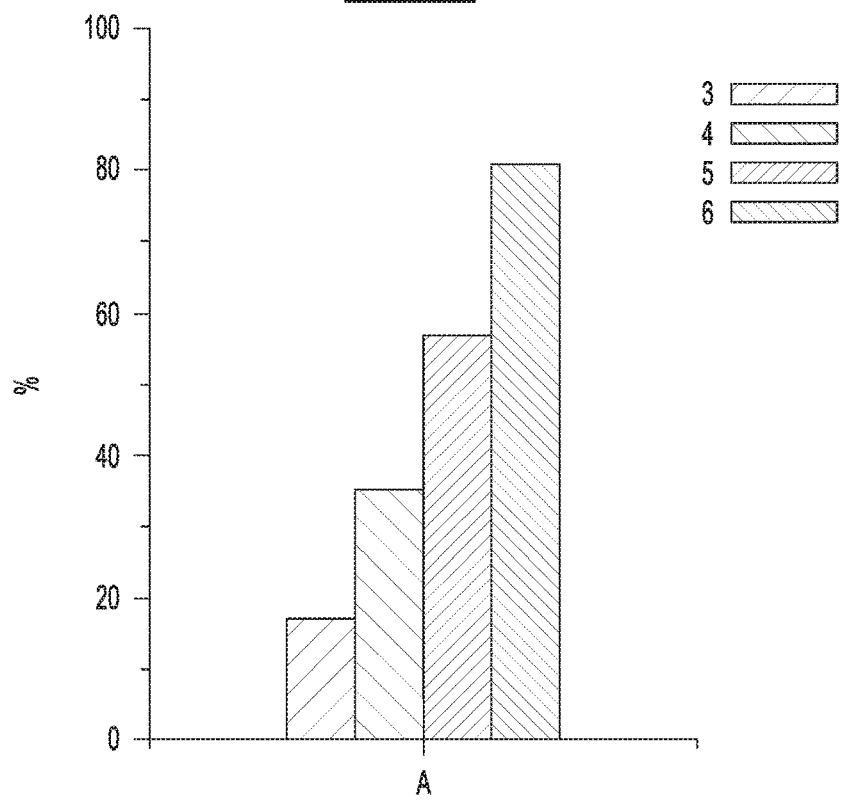
FIG. 7 is a graph depicting the platinum dispersion (shown as a percentage on the Y-axis) for two comparative examples (3, 4) and two examples including the PGM complexes disclosed herein (5, 6) after aging (A)

The platinum dispersion (i.e., the ratio of the number of surface Pt atoms to the total number of Pt atoms) for Comparative Samples 3 and 4 and Samples 5 and 6 after aging was determined by chemisorption. The platinum dispersion results are shown in FIG. 7. As depicted, Comparative Samples 3 and 4 (labeled "3" and "4", respectively, with no stabilizing structures) had a platinum dispersion less than 40% aging, while Sample 5 (labeled "5") had a platinum dispersion close to 60% and Sample 6 (labeled "6") had a platinum dispersion close to 80% after aging. The aging results of Comparative Samples 3 and 4 are significantly reduced compared to the aging results of Samples 5 and 6. These results indicate that the non-stabilized platinum of Comparative Samples 3 and 4 had undergone sintering and particle growth to a much greater extent than Sample 5 and 6. As such, the catalysts of Comparative Samples 3 and 4 had a reduced number of surface Pt atoms available for catalysis after aging, when compared to Samples 5 and 6.

Comparative Samples 3 and 4 and Samples 5 and 6 were then exposed to exhaust gas (containing 5000 ppm CO, 500 ppm HC, 1.0% $O_2$, 5% $H_2O$, and $N_2$ balance) at an inlet temperature that was ramped up at a rate of 2° C. per minute (from 100° C. to 350° C.). The space velocity (SV) was 1,500,000 $cm^3$ $g_{catalyst}^{-1}$ $h^{-1}$ where space velocity refers to the quotient of the entering volumetric flow rate of the reactants divided by the reactor volume (or the catalyst bed volume) in a unit time. The conversion of CO and $C_3H_6$ were determined.

Figure 8A:
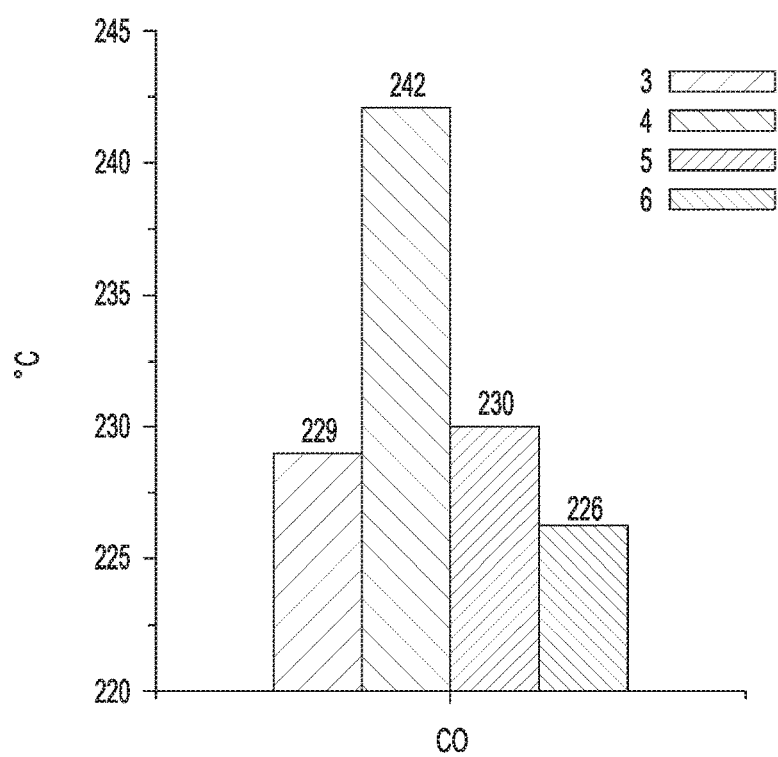
FIGS. 8A and 8B are graphs depicting the light-off temperature (in ° C.) respectively for carbon monoxide (CO) conversion and for $C_3H_6$ (propene or, alternatively, propylene) conversion for the two comparative examples (3, 4) and the two examples including the PGM complexes disclosed herein (5, 6).
Figure 8B:
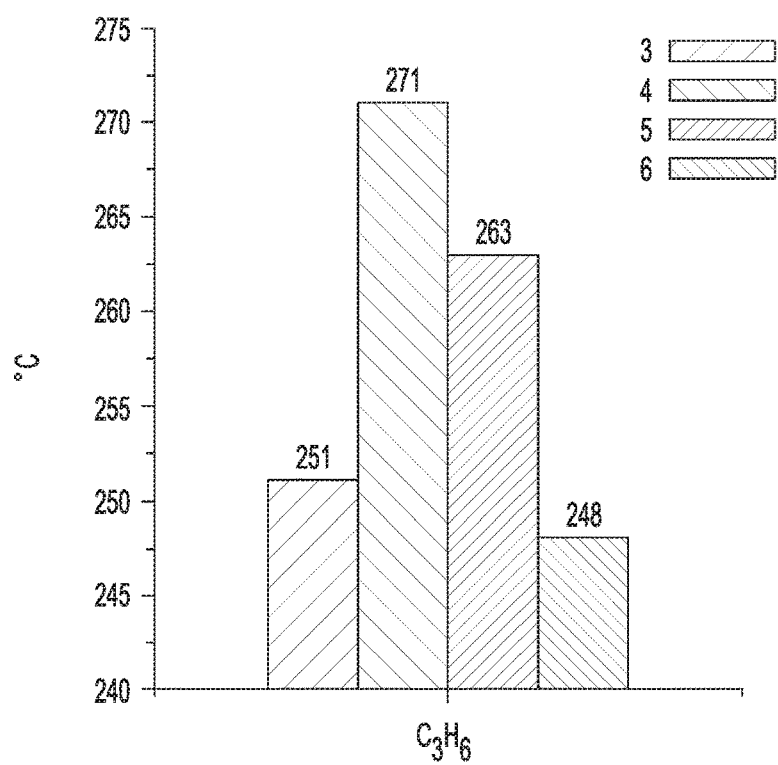

The light-off temperatures of the Comparative Samples 3 and 4 and Samples 5 and 6 for CO and for $C_3H_6$ were determined. The light-off temperatures were measured at $T_{50}$, which is the temperature at which 50% conversion of CO or $C_3H_6$ was achieved. The lower $T_{50}$, the better. The CO light-off temperatures are shown in FIG. 8A and the $C_3H_6$ light-off temperatures are shown in FIG. 8B. Example 5 performed better than Comparative Example 4, with less platinum. Due to much less platinum sintering (as evidenced in FIG. 7), the CO and $C_3H_6$ oxidation rates of Example 6 (0.4 wt % Pt with the barium-containing stabilizing structure) were 3 times and 10 times lower, respectively, than those of Comparative Example 4 (0.5 wt % Pt with no stabilizing structure). These results also indicate that Example 6 was as active as Comparative Example 3 with much less of the platinum.

It is to be understood that the ranges provided herein include the stated range and any value or sub-range within the stated range. For example, a range of from about 300° C. to about 650° C. should be interpreted to include not only the explicitly recited limits of from about 300° C. to about 650° C., but also to include individual values, such as 425° C., 480° C., 520.5° C. etc., and sub-ranges, such as from about 415° C. to about 575° C., etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A catalytic converter, comprising:
   a catalyst including:
      a non-modified metal oxide support; and
      platinum group metal (PGM) complexes atomically dispersed on the non-modified metal oxide support, the PGM complexes including:
         a PGM species being selected from the group consisting of an atom of a platinum group metal, a cluster including from 2 atoms to less than 10 atoms of the platinum group metal, and combinations thereof; and
         a stabilizing structure bonded to the PGM species, the stabilizing structure comprising an alkali metal or an alkaline earth metal, an oxygen atom and a hydrogen atom.

2. The catalytic converter as defined in claim 1 wherein a mole ratio of the PGM species to the alkali metal or the alkaline earth metal ranges from 1:3 to 1:10.

3. The catalytic converter as defined in claim 1 wherein the non-modified metal oxide support is selected from the group consisting of $Al_2O_3$, $CeO_2$, $ZrO_2$, $CeO_2$—$ZrO_2$, $SiO_2$, $TiO_2$, ZnO, zeolites, perovskites, and combinations thereof.

4. The catalytic converter as defined in claim 1 wherein:
   the alkali metal is selected from the group consisting of lithium, sodium, potassium, rubidium, cesium, and francium; or
   the alkaline earth metal is selected from the group consisting of beryllium, magnesium, calcium, strontium, barium, and radium.

5. The catalytic converter as defined in claim 1 wherein the PGM species is present in an amount ranging from greater than 0 wt % to about 5 wt % based on a total w % of the catalyst.

6. The catalytic converter as defined in claim 1 wherein the platinum group metal is selected from the group consisting of palladium, platinum, rhodium, ruthenium, osmium, iridium, and combinations thereof.

7. The catalytic converter as defined in claim 1 wherein the alkali metal or alkaline earth metal in the stabilizing structure is bonded to the PGM species via an oxygen linkage.

8. The catalytic converter as defined in claim 7, further comprising an additional PGM species bonded to the non-modified metal oxide support through an other oxygen linkage.

9. A method for forming a catalyst, the method comprising forming atomically dispersed platinum group metal (PGM) complexes on a non-modified metal oxide support, the PGM complexes including:
   a PGM species being selected from the group consisting of an atom of a platinum group metal, a cluster including from 2 atoms to less than 10 atoms of the platinum group metal, and combinations thereof; and
   a stabilizing structure bonded to the PGM species, the stabilizing structure comprising an alkali metal or an alkaline earth metal, an oxygen atom, and a hydrogen atom.

10. The method as defined in claim 9 wherein:
    the PGM species is a platinum atom or a platinum cluster;
    the PGM complex includes the alkali metal; and
    the forming of the atomically dispersed platinum group metal (PGM) complexes on the non-modified metal oxide support is accomplished by:
        co-impregnating a platinum precursor and an alkali metal precursor on the non-modified metal oxide support; and calcining the co-impregnated non-modified metal oxide support.

11. The method as defined in claim 10 wherein:
the platinum precursor is selected from the group consisting of tetraammineplatinum (II) nitrate, tetraammineplatinum (II) chloride, tetraammineplatinum (II) hydroxide, chloroplatinic acid, platinum nitrate, platinum acetate, and dinitrodiamine platinum; and
the alkali metal precursor is selected from the group consisting of potassium hydroxide, potassium nitrate, lithium hydroxide, lithium nitrate, sodium hydroxide, sodium nitrate, rubidium hydroxide, rubidium nitrate, cesium hydroxide, cesium nitrate, francium hydroxide, francium nitrate, and combinations thereof.

12. The method as defined in claim 9 wherein the forming of the atomically dispersed platinum group metal (PGM) complexes on the non-modified metal oxide support is accomplished by:
impregnating one of i) a platinum group metal (PGM) precursor or ii) an alkali metal precursor or an alkaline earth metal precursor on the non-modified metal oxide support to form an impregnated non-modified metal oxide support;
drying the impregnated non-modified metal oxide support at a temperature below a calcination temperature;
impregnating the other of i) the platinum group metal precursor or ii) the alkali metal precursor or the alkaline earth metal precursor on the impregnated non-modified metal oxide support to form a co-impregnated non-modified metal oxide support;
drying the co-impregnated non-modified metal oxide support at a temperature below a calcination temperature; and
calcining the co-impregnated non-modified metal oxide support.

13. The method as defined in claim 12 wherein the calcining is accomplished at a temperature ranging from about 350° C. to about 550° C. for a time ranging from about 2 hours to about 10 hours.

14. The method as defined in claim 12 wherein:
the PGM precursor is selected from the group consisting of tetraammineplatinum (II) nitrate, tetraammineplatinum (II) chloride, tetraammineplatinum (II) hydroxide, chloroplatinic acid, platinum nitrate, platinum acetate, dinitrodiamine platinum, palladium nitrate, palladium acetate, bis-acetylacetonato palladium, rhodium nitrate, rhodium acetate, hexachloroiridic acid hexhydrate, ruthenium (III) chloride, ruthenium (III) acetylacetonate, ruthenium (II) hexa-ammine dichloride, ruthenium (III) hexa-ammine trichloride, osmium (III) chloride hydrate, ammonium hexachloroosmate (IV), iridium (IV) chloride, ammonium hexachloroiridate, iridium (III) chloride, iridium sulfate, and combinations thereof; and
the alkali metal precursor is selected from the group consisting of potassium hydroxide, potassium nitrate, lithium hydroxide, lithium nitrate, sodium hydroxide, sodium nitrate, rubidium hydroxide, rubidium nitrate, cesium hydroxide, cesium nitrate, francium hydroxide, francium nitrate, and combinations thereof; or the alkaline earth metal precursor is selected from the group consisting of barium hydroxide, barium nitrate, magnesium hydroxide, magnesium nitrate, beryllium hydroxide, beryllium nitrate, calcium hydroxide, calcium nitrate, strontium hydroxide, strontium nitrate, radium hydroxide, radium nitrate, and combinations thereof.

15. The method as defined in claim 9 wherein prior to forming the atomically dispersed PGM complexes on the non-modified metal oxide support, the method further comprises calcining the non-modified metal oxide support at a temperature ranging from about 350° C. to about 450° C. for a time ranging from about 9 hours to about 11 hours.

16. The method as defined in claim 9 wherein prior to forming the atomically dispersed PGM complexes on the non-modified metal oxide support, the method further comprises heating the non-modified metal oxide support in vacuum at a temperature ranging from about 60° C. to about 80° C. for a time ranging from about 10 hours to about 72 hours.

17. The method as defined in claim 9 wherein the forming of the atomically dispersed platinum group metal (PGM) complexes on the non-modified metal oxide support is accomplished by:
dispersing a platinum group metal (PGM) precursor on the non-modified metal oxide support by incipient wet impregnation and drying to form a powder;
dry grinding an alkali metal precursor or an alkaline earth metal precursor with the powder at a temperature ranging from about 18° C. to about 80° C. for a time ranging from about 15 minutes to about 10 hours to form a powder mixture;
drying the powder mixture at a temperature ranging from about 18° C. to about 80° C. for a time ranging from about 8 hours to about 12 hours; and
calcining the powder mixture.

18. The method as defined in claim 17 wherein:
the PGM precursor is selected from the group consisting of tetraammineplatinum (II) nitrate, tetraammineplatinum (II) chloride, tetraammineplatinum (II) hydroxide, chloroplatinic acid, platinum nitrate, platinum acetate, dinitrodiamine platinum, palladium nitrate, palladium acetate, bis-acetylacetonato palladium, rhodium nitrate, rhodium acetate, hexachloroiridic acid hexhydrate, ruthenium (III) chloride, ruthenium (III) acetylacetonate, ruthenium (II) hexa-ammine dichloride, ruthenium (III) hexa-ammine trichloride, osmium (III) chloride hydrate, ammonium hexachloroosmate (IV), iridium (IV) chloride, ammonium hexachloroiridate, iridium (III) chloride, iridium sulfate, and combinations thereof; and
the alkali metal precursor is selected from the group consisting of potassium hydroxide, potassium nitrate, lithium hydroxide, lithium nitrate, sodium hydroxide, sodium nitrate, rubidium hydroxide, rubidium nitrate, cesium hydroxide, cesium nitrate, francium hydroxide, francium nitrate, and combinations thereof; or the alkaline earth metal precursor is selected from the group consisting of barium hydroxide, barium nitrate, magnesium hydroxide, magnesium nitrate, beryllium hydroxide, beryllium nitrate, calcium hydroxide, calcium nitrate, strontium hydroxide, strontium nitrate, radium hydroxide, radium nitrate, and combinations thereof.

19. The method as defined in claim 9 wherein the forming of the atomically dispersed platinum group metal (PGM) complexes on the non-modified metal oxide support is accomplished by:
first forming the PGM complexes by:
preparing an aqueous solution of a PGM oxide or a PGM hydroxide;
heating the aqueous solution up to a temperature of about 80° C.; and mixing an alkali metal hydroxide or an alkaline earth metal hydroxide into the aqueous solution at the temperature; and then impregnating the PGM complexes on the non-modified metal oxide support.

20. The method as defined in claim 19, further comprising calcining the non-modified metal oxide support having the PGM complexes thereon.

\* \* \* \* \*